(12) United States Patent
Ren et al.

(10) Patent No.: US 9,859,051 B2
(45) Date of Patent: Jan. 2, 2018

(54) MAGNETICALLY PERMEABLE CORE FOR USE IN WIRELESS POWER TRANSFER SYSTEMS

(71) Applicant: PowerbyProxi Limited, Freemans Bay, Auckland (NZ)

(72) Inventors: Saining Ren, Auckland (NZ); Lawerence Bernardo Dela Cruz, Auckland (NZ); Rex Pius Huang, Auckland (NZ); Ali Abdolkhani, Auckland (NZ)

(73) Assignee: PowerbyProxi Limited, Freemans Bay, Auckland (NZ)

( * ) Notice: Subject to any disclaimer, the term of this patent is extended or adjusted under 35 U.S.C. 154(b) by 422 days.

(21) Appl. No.: 14/407,248

(22) PCT Filed: Jun. 11, 2013

(86) PCT No.: PCT/NZ2013/000099
§ 371 (c)(1),
(2) Date: Dec. 11, 2014

(87) PCT Pub. No.: WO2013/187777
PCT Pub. Date: Dec. 19, 2013

(65) Prior Publication Data
US 2015/0162120 A1 Jun. 11, 2015

Related U.S. Application Data

(60) Provisional application No. 61/785,515, filed on Mar. 14, 2013.

(30) Foreign Application Priority Data

Jun. 11, 2012 (EP) .................................... 12171536

(51) Int. Cl.
*H01F 38/14* (2006.01)
*H01F 3/10* (2006.01)
(Continued)

(52) U.S. Cl.
CPC ............... *H01F 38/14* (2013.01); *H01F 3/10* (2013.01); *H01F 17/045* (2013.01);
(Continued)

(58) Field of Classification Search
CPC .......... H01F 38/14; H01F 3/10; H01F 17/045; H01F 41/005; H01F 17/043; H01F 27/02;
(Continued)

(56) References Cited

U.S. PATENT DOCUMENTS 4,183,193 A  1/1980 Klingelhofer et al.
5,506,560 A  4/1996 Takeuchi et al.
(Continued)

FOREIGN PATENT DOCUMENTS

DE  1915044 A1  10/1970
DE  3213602 A1  10/1983
(Continued)

OTHER PUBLICATIONS

English translation of DE 100 44 558 (Mahrt), Mar. 21, 2002, downloaded from https://worldwide.espacenet.com Mar. 13, 2017.*
(Continued)

*Primary Examiner* — Hal Kaplan
(74) *Attorney, Agent, or Firm* — Merchant & Gould P.C.

(57) ABSTRACT

A magnetically permeable core for use in wireless power transfer systems. The core includes a base with first and second portions that extend away from the base. The first portion extends further from the base than the second portion in order to maintain an effective flux linkage throughout a range of relative displacement of a receiving core from a transmitting core. Transmitters and/or receivers
(Continued)

for use in wireless power transfer systems may include the magnetically permeable core and windings.

20 Claims, 13 Drawing Sheets

(51) Int. Cl.
- *H01F 17/04* (2006.01)
- *H01F 27/24* (2006.01)
- *H04B 5/00* (2006.01)
- *H02J 5/00* (2016.01)
- *H02J 7/02* (2016.01)
- *H01F 41/00* (2006.01)

(52) U.S. Cl.
CPC ............ *H01F 41/005* (2013.01); *H02J 5/005* (2013.01); *H02J 7/025* (2013.01); *H04B 5/0037* (2013.01); *H04B 5/0075* (2013.01); *H04B 5/0093* (2013.01); *Y10T 29/49071* (2015.01)

(58) Field of Classification Search
CPC ........ H01F 27/022; H01F 17/04; H01F 27/24; H02J 5/005; H02J 7/025; H04B 5/0037; H04B 5/0075; H04B 5/0093; Y10T 29/49071
USPC ...................... 307/104; 336/83, 90, 212, 221
See application file for complete search history.

(56) References Cited

U.S. PATENT DOCUMENTS

| | | | |
|---|---|---|---|
| 5,654,621 | A | 8/1997 | Seelig |
| 5,945,744 | A | 8/1999 | Dobler et al. |
| 6,510,109 | B2 | 1/2003 | Ohmori |
| 7,103,413 | B2 | 9/2006 | Swanson et al. |
| 7,394,243 | B2 | 7/2008 | Tsuchida et al. |
| 7,525,283 | B2 | 4/2009 | Cheng et al. |
| 7,599,744 | B2 | 10/2009 | Giordano et al. |
| 8,125,305 | B2 | 2/2012 | Saito et al. |
| 2004/0000466 | A1 | 1/2004 | Kubat et al. |
| 2004/0046634 | A1 | 3/2004 | Gokhale et al. |
| 2010/0270288 | A1 | 10/2010 | Hackbarth et al. |

FOREIGN PATENT DOCUMENTS

| | | |
|---|---|---|
| DE | 3733944 A1 | 4/1989 |
| DE | 3839386 A1 | 5/1990 |
| DE | 10044558 A1 | 3/2002 |
| DE | 10341113 B4 | 4/2009 |
| EP | 0 370 377 A2 | 5/1990 |
| EP | 0 370 377 A3 | 5/1990 |
| EP | 0 399 563 A2 | 11/1990 |
| EP | 0 399 563 A3 | 11/1990 |
| EP | 0 965 521 A1 | 12/1999 |
| EP | 1 372 173 A1 | 12/2003 |
| EP | 1 372 173 B1 | 5/2008 |
| FR | 2380945 | 9/1978 |
| GB | 2103886 | 2/1983 |
| JP | 57096513 A | 6/1982 |
| JP | 59-058811 | 4/1984 |
| JP | 60-254400 | 12/1985 |
| JP | S60-254440 | 12/1985 |
| JP | 6-197479 | 7/1994 |
| JP | 09007837 A | 1/1997 |
| JP | 2001196249 | 7/2001 |
| JP | 2003-118671 | 4/2003 |
| JP | 2004-235462 | 8/2004 |
| JP | 2011-103694 | 5/2011 |
| JP | 4747789 B2 | 5/2011 |
| JP | 04835787 B1 | 12/2011 |
| WO | WO 2007/131373 A1 | 11/2007 |
| WO | WO 2009/015745 | 5/2009 |
| WO | 2010124165 A1 | 10/2010 |
| WO | 2013186180 A1 | 12/2013 |
| WO | 2013187777 A2 | 12/2013 |

OTHER PUBLICATIONS

English translation of JP 2003-118671 (Watanabe et al.), Apr. 23, 2003, downloaded from https://worldwide.espacenet.com Mar. 13, 2017.*

Japanese Office Action for JP Application No. 2015-517219 dated Jan. 25, 2016 (3 pages).

European Search Report for EP Application No. 13 80 4118 dated Feb. 1, 2016 (8 pages).

Japanese Office Action for JP 2015-517219 dated Sep. 16, 2016 (2 pages).

International Search Report and Written Opinion for PCT/NZ2016/050126 dated Nov. 1, 2016 (15 pages).

International Search Report for International Application No. PCT/NZ2013/000099 dated May 14, 2014 (1 page).

International Search Written Opinion for International Application No. PCT/NZ2013/000099 dated Dec. 16, 2014 (8 pages).

\* cited by examiner

MAGNETICALLY PERMEABLE CORE FOR USE IN WIRELESS POWER TRANSFER SYSTEMS

This application is a National Stage Application of PCT/NZ2013/000099, filed 11 Jun. 2013, which claims benefit of Ser. No. 12/171,536.1, filed 11 Jun. 2012 in the Europe Patent Office, and Ser. No. 61/785,515, filed 14 Mar. 2013 in the United States and which applications are incorporated herein by reference. To the extent appropriate, a claim of priority is made to each of the above disclosed applications.

FIELD OF THE INVENTION

The present invention is in the field of wireless power transfer systems. More particularly, the invention relates to magnetically permeable cores incorporated into transmitters and receivers in wireless power transfer systems.

BACKGROUND OF THE INVENTION

Wireless power transfer systems are a well known area of both established and developing technology. Typically, a primary side (or transmitter) generates a time-varying magnetic field from a transmitting coil or coils. This magnetic field induces an alternating current in a suitable receiving coil in a secondary side (or receiver) that can then be used to charge a battery or power a load, such as a portable device.

A basic problem that must be overcome in wireless power transfer system design is ensuring that power can be transferred over sufficient displacements (i.e. between the primary side and secondary side), while maintaining a sufficient amount of power transfer.

It is known that introducing magnetically permeable elements into either the transmitting coils or receiving coils can improve the performance of the system. Magnetically permeable elements increase the inductance of the transmitter or receiver. This means that less coil turns are required to achieve the same inductance value as a transmitter or receiver without magnetically permeable elements. Having fewer coils turns results in a decrease in losses due to resistance in the coil wire. Magnetically permeable elements can also be configured to 'shape' the magnetic field, which can be directed from the transmitter to the receiver. By directing the magnetic field, the coupling factor between the transmitter and receiver can be increased, thus improving the performance of the system.

For wireless power transfer systems, the magnetically permeable element may be in the form of a planar sheet underneath a layer of windings. In other applications, the magnetically permeable element may be a core, about which the windings of the transmitting coils or receiving coils are wound.

It is an object of the invention to provide a magnetically permeable core for use in transmitters or receiver, which improves the tolerable displacement between the transmitter and receiver, or to at least provide the public with a useful choice.

SUMMARY OF THE INVENTION

According to one exemplary embodiment there is provided a magnetically permeable core for use in a wireless power transfer system, including a base having first and second portions extending away therefrom, wherein the first portion extends further from the base than the second portion such as to maintain an effective flux linkage throughout a range of relative displacement of a receiving core from a transmitting core According to another exemplary embodiment there is provided a magnetically permeable core for use in a wireless power transfer system, including a base having first and second portions extending away therefrom and at least one opening that allows access from one side of the base through to a space provided between the first portion and second portion, wherein the first portion extends further from the base than the second portion such as to maintain an effective flux linkage throughout a range of relative displacement of a receiving core from a transmitting core and the at least one opening extends to the edge of the base.

According to a further exemplary embodiment there is provided a transmitter or receiver for use in a wireless power transfer system, including windings and a magnetically permeable core having a base having first and second portions extending away therefrom, wherein the first portion extends further from the base than the second portion such as to maintain an effective flux linkage throughout a range of relative displacement of a receiving core from a transmitting core and wherein the windings surround the first portion at least partially in a space between the first portion and second portion.

According to another exemplary embodiment there is provided a transmitter and receiver for use in a wireless power transfer system, wherein both the transmitter and receiver include windings and a magnetically permeable core, and the transmitting core has a base having first and second portions extending away therefrom, wherein the first portion extends further from the base than the second portion such that the first portion of the transmitting core is in closer proximity to the receiving core than the second portion of the transmitter.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
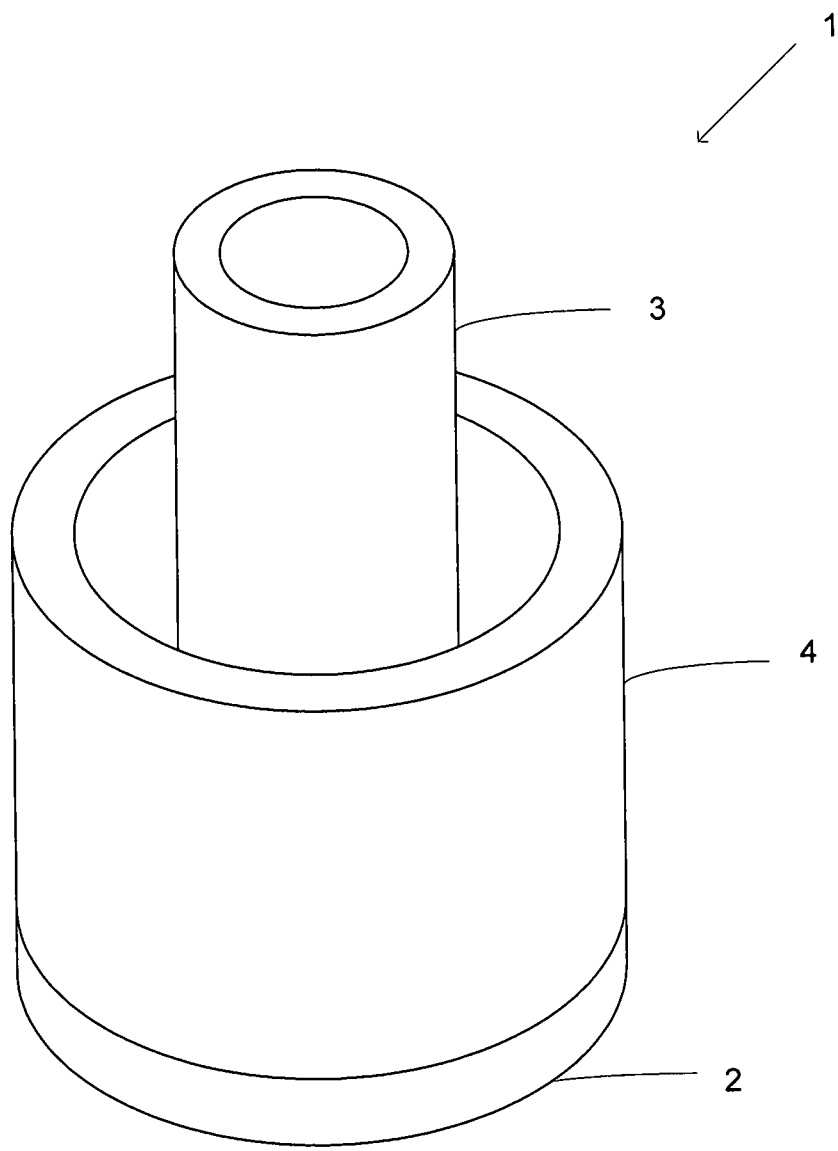
FIG. 1 shows a magnetically permeable core according to one embodiment of the present invention.

FIG. 1 shows a magnetically permeable core 1. Such a core may be adapted for incorporation into transmitters or receivers for use in wireless power transfer systems. The core includes a base 2 from which extends a first portion 3 and a second portion 4. The base connects the first portion to the second portion. Importantly, the first portion extends further from the base than the second portion. It is this difference in length between the first portion and the second portion that ensures an effective flux linkage is maintained for a range of displacements between a transmitting core and receiving core. This will be discussed in more detail in a later section. In one embodiment, the first portion may extend at least 20 percent further from the base than the second portion.

In the core 1 of FIG. 1, the base is a circular planar disk 2. The first portion is a column 3 extending perpendicularly from the centre of the disk and the second portion is a cylinder 4 extending from the periphery of the disk. The column and cylinder are concentric. The column extends further from the disk than the cylinder. The remainder of the description will refer to, and describe in more detail, the column (being the first portion), the cylinder (being the second portion) and the disk. However, those skilled in the art will appreciate that there are many other possible geometries that do not depart from the invention. For example:

the base may be another shape besides circular;
the first portion may not be circular;
the second portion may not be a complete cylinder, i.e. only partially surrounding the first portion; or
the second portion may be a column extending from the centre of the base, and the first portion may be a cylinder extending from the periphery of the disk.

Figure 2:
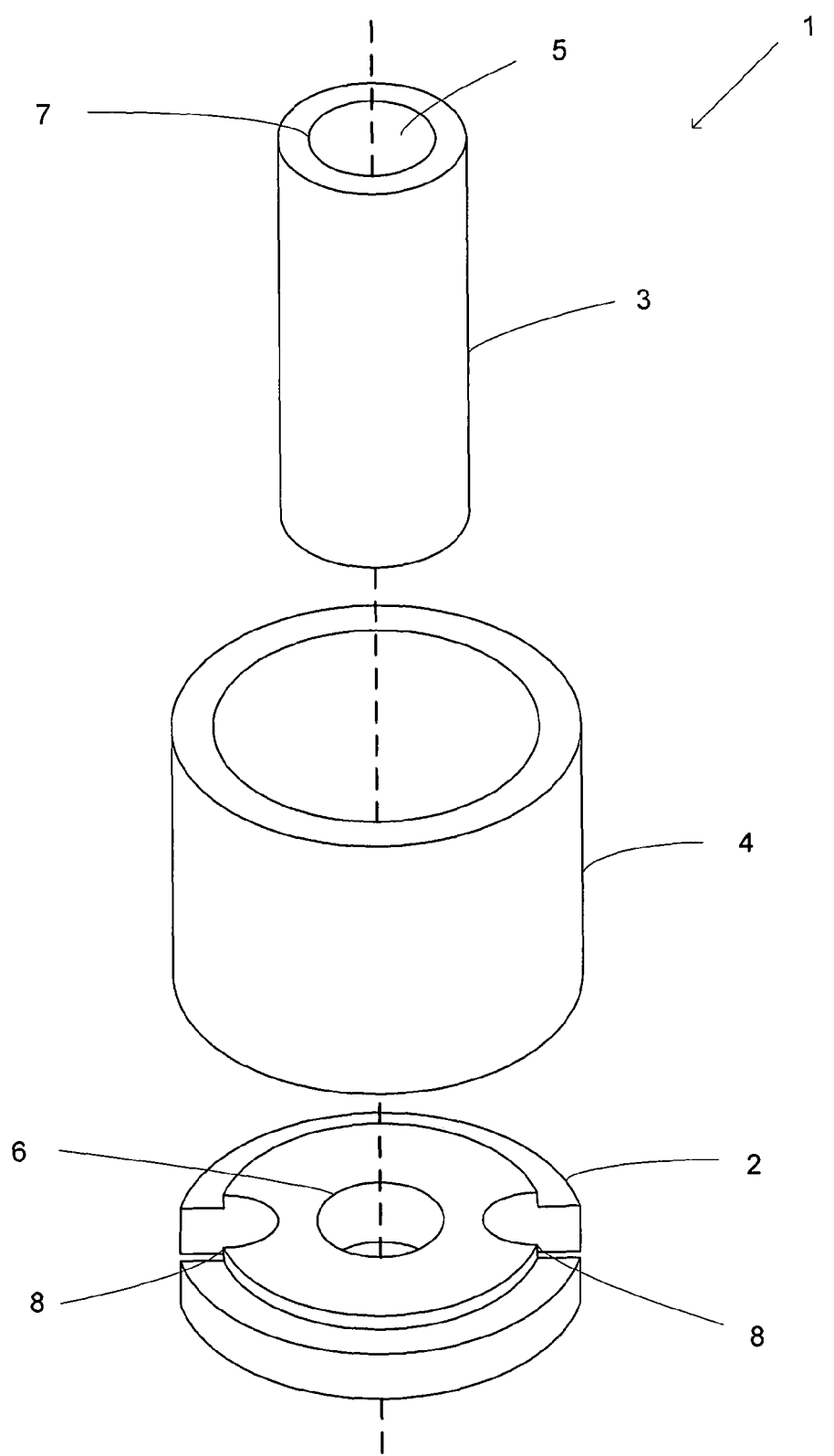
FIG. 2 shows an exploded view of the magnetically permeable core of FIG. 1.

The core 1 is made from a magnetically permeable material. This may include ferrite or another suitable material. The core may be formed as a single piece, or, as shown in the exploded view of FIG. 2, made from separate pieces. In FIG. 2, the column 3, cylinder 4 and disk 2 are three separate pieces. In another embodiment, the column and disk may be formed as a single piece and the cylinder as another piece. Upon assembly, these pieces may be fixed together in some way (for example, by adhesive) or they may be held in proximal position by some other means. Those skilled in the art will appreciate that having the core formed as a single piece will improve the inductance value of the core. Conversely, having the core formed from separate pieces may simplify manufacture. Further, having a division between the pieces (even where those pieces are directly abutting) may prevent the onset of magnetic saturation in the core. It is possible that the component pieces (i.e. the column, cylinder and disk) may themselves consist of separate pieces. For example, the column may be segmented into a 'stack' of shorter columns (not shown). This may also prevent the onset of magnetic saturation.

The column 3 and disk 2 may include a channel 5. In the core shown in FIG. 2, this channel consists of a hole 6 in the centre of the disk that aligns with a bore 7 that passes through the length of the column (i.e. the column is hollowed). As will be discussed later, such a channel may permit communication systems or similar to pass from one side of the core to the other. In another embodiment, there may be no channel (i.e. there may be no central hole in the disk and the column may be solid). Though this may obstruct communication systems, it may allow the column to be narrower, while having the same cross-sectional area as its hollowed counterpart. It will be appreciated that such a channel may occupy space that could otherwise be filled with magnetically permeable material. This effectively lessens the inductance value of the column, which may have to be compensated for in some way—for example, by making the column longer or wider.

The disk 2 may include openings 8 that allow access from one side of the disk to the space between the column 3 and the cylinder 4. Such an opening may be provided to allow wire for the windings to enter and exit the 'inside' of the core 1. In FIG. 2, there are two openings 8 for each end of the wire. The openings may be holes that pass through the disk or they may be 'cut-outs' 8 (as shown in FIG. 2) that extend to the edge of the disk 2. Where the disk and cylinder 4 are formed together, the cut-outs may extend all the way to the edge of the cylinder (effectively creating a slot through the cylinder). As will be discussed in more detail later, such cut-outs may be preferable to holes as they eliminate an interfering flux path that would otherwise encircle the opening.

Figure 3:
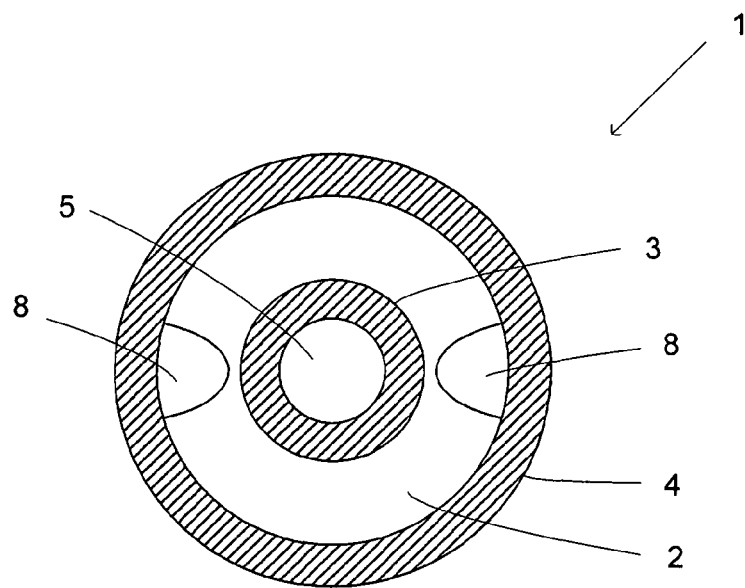
FIG. 3 shows a top view of the magnetically permeable core of FIG. 1.

FIG. 3 shows a cross-section of the core 1 in a plane parallel with the disk 2. It shows the disk, and a cross-section of the column 3 and the cylinder 4. The channel 5 and openings 8 discussed previously are also shown. The cross-section shows that the thickness of the cylinder and hollowed column may be the same. A magnetic field must pass through the cylinder and the column (via the disk). A key consideration will be the relative cross-sectional areas, as the flux may be limited by the total cross-sectional area of a particular part. In the core 1 shown in FIG. 3, the cross-sectional area of the column 3 is the smallest, and it is therefore this which may limit the amount of magnetic flux that is able to be generated without the core overheating. Those skilled in the art will appreciate how the core dimensions will need to be configured with this in mind. FIG. 3 also shows that in this particular embodiment the core has a generally circular cross-section. This may be suitable where the core needs to be rotationally symmetric.

Figure 4:
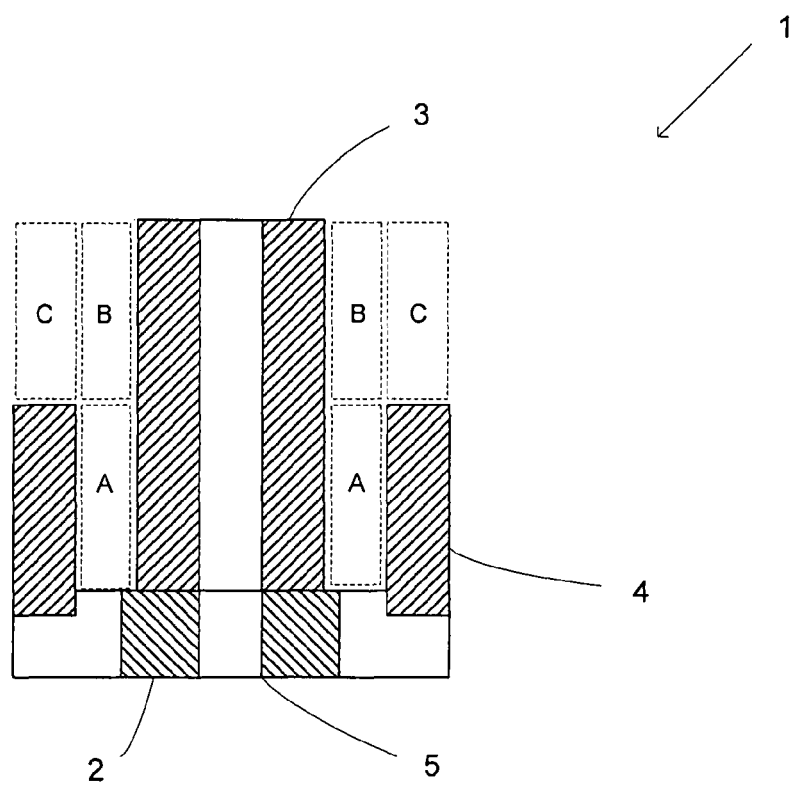
FIG. 4 shows a cross-section of the magnetically permeable core of FIG. 1.

FIG. 4 shows a cross-section of the core 1 in a plane perpendicular to the disk 2. It shows the disk, cylinder 4 and column 3. It also shows how the channel 5 passes through the disk and the column. It is helpful to identify three volumes within the boundaries that are defined by the core:

the volume provided between the column and the cylinder ('volume A');

the volume around the first portion further from the disk than the cylinder ('volume B'); and the volume that would be taken up by the cylinder were it to extend the same distance from the disk as the column ('volume C').

As will be described in more detail later, each of these three volumes may be used to accommodate windings.

Having described the underlying geometry of the core, it is appropriate to now consider a core in the context of a transmitter or receiver, which will show the benefits of the core's underlying geometry.

Figure 5:
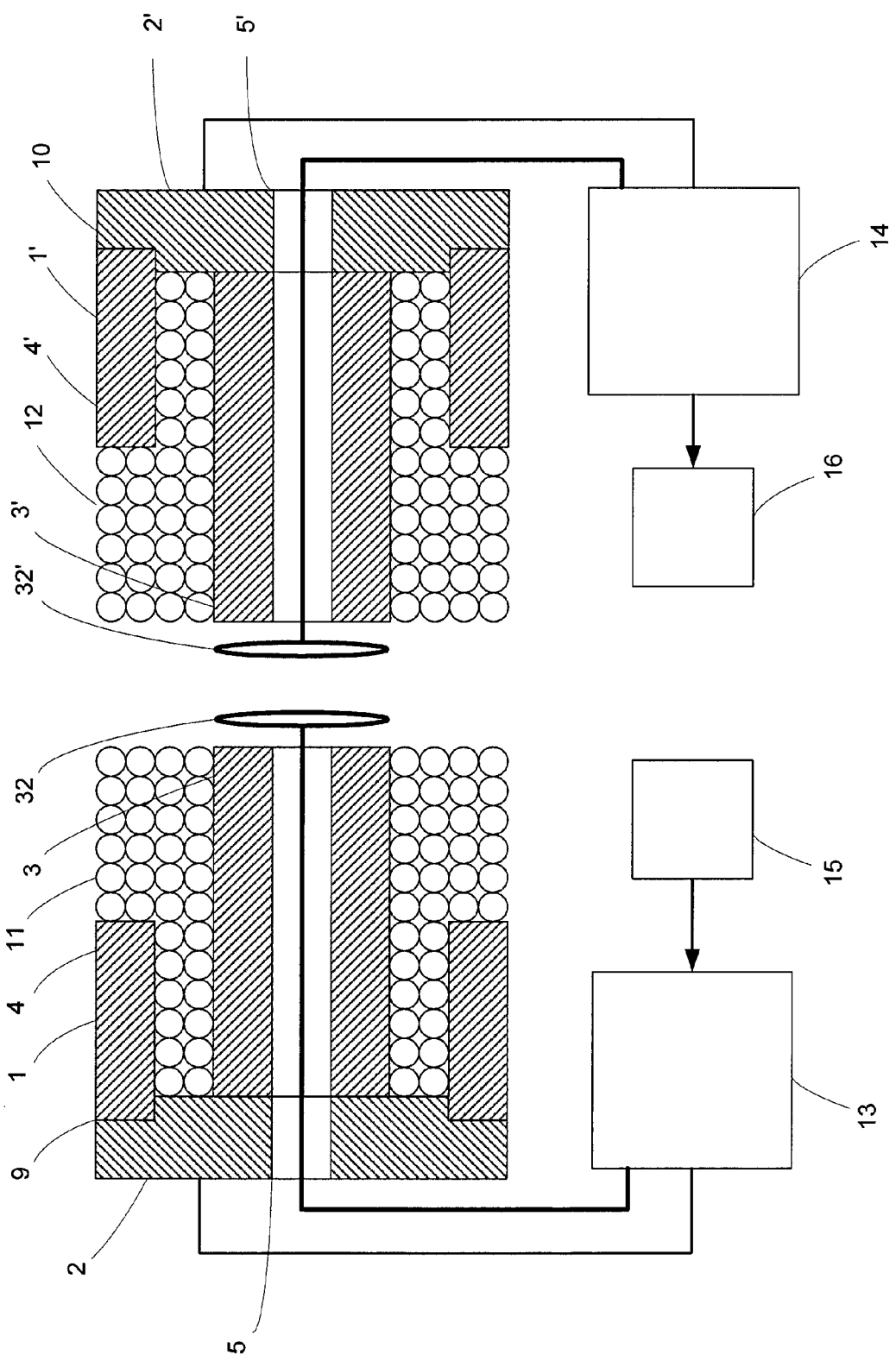
FIG. 5 shows a cross-section of a transmitter and receiver pair.

FIG. 5 shows a cross-section of a transmitter 9 and a receiver 10. The transmitter and receiver are generally the same geometries, both including a magnetically permeable core 1 (as described above), windings 11, 12 and circuitry 13, 14.

In the case of the transmitter 9, the circuitry 13 will be transmitter circuitry that is adapted to connect to a suitable power supply 15 and to output an alternating current into the windings 11, which in turn will generate a magnetic field. Those skilled in the art will appreciate that there are any number of approaches to such transmitter circuitry, and the invention is not limited in this respect.

Similarly, in the receiver 10, the circuitry 14 will be receiver circuitry that is adapted to receive power from the windings 12, and to output power, that may subsequently be used to power a load or charge a battery 16. Those skilled in the art will appreciate that there are any number of approaches to such receiver circuitry, and the invention is not limited in this respect.

Figure 6:
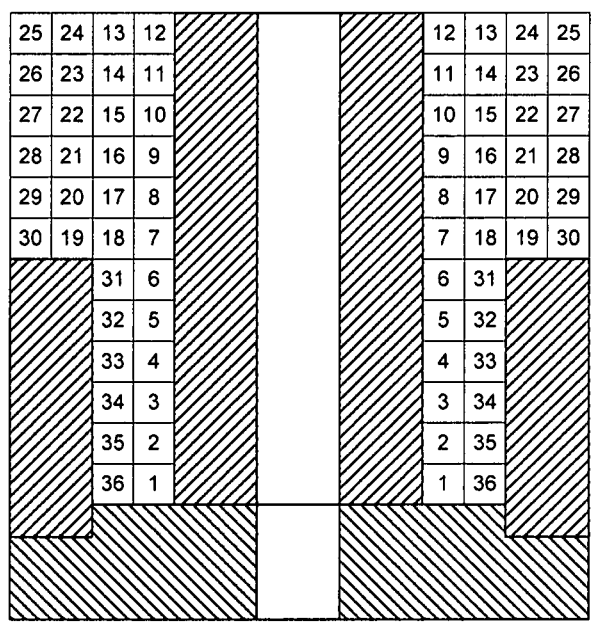
FIG. 6 shows a cross-section of a magnetically permeable core.

The transmitter 9 and receiver 10 include the core 1, 1', consisting of a column 3, 3', base 2, 2', cylinder 4, 4', channel 5, 5', and windings 11, 12. The windings consist of a length of wire, wound in a series of loops. The windings are configured to occupy volume A, volume B and volume C within the core. As will be readily appreciated, the number of loops will be related to the gauge of wire, the relative dimensions of the core and the power requirements for the transmitter or receiver. Preferably, there will be an even number of layers as this simplifies the winding process. FIG. 6, shows one possible approach to winding. The winding begins with layer 1, and then follows the order indicated by the numbers.

Figure 7:
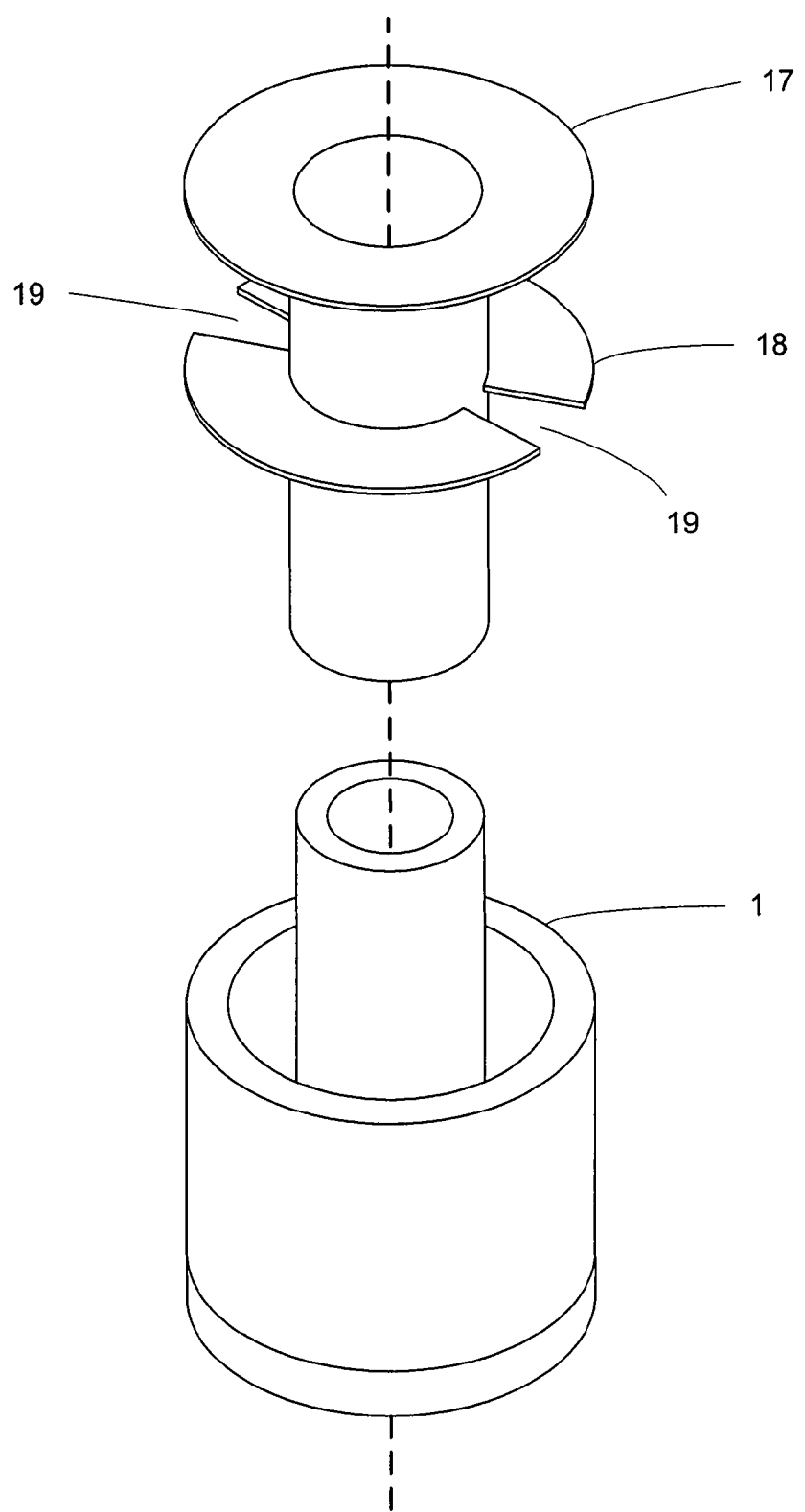
FIG. 7 shows an exploded view of a magnetically permeable core and a bobbin.

In one embodiment, as shown in FIG. 7 the windings (not shown) may be wound on a bobbin 17, which can then be inserted into the core 1. Such a bobbin may include partitions 18 to separate the bobbin into zones, corresponding to the volumes inside the core. The bobbin may include slots 19 to allow the wire to move between zones.

Figure 8A:
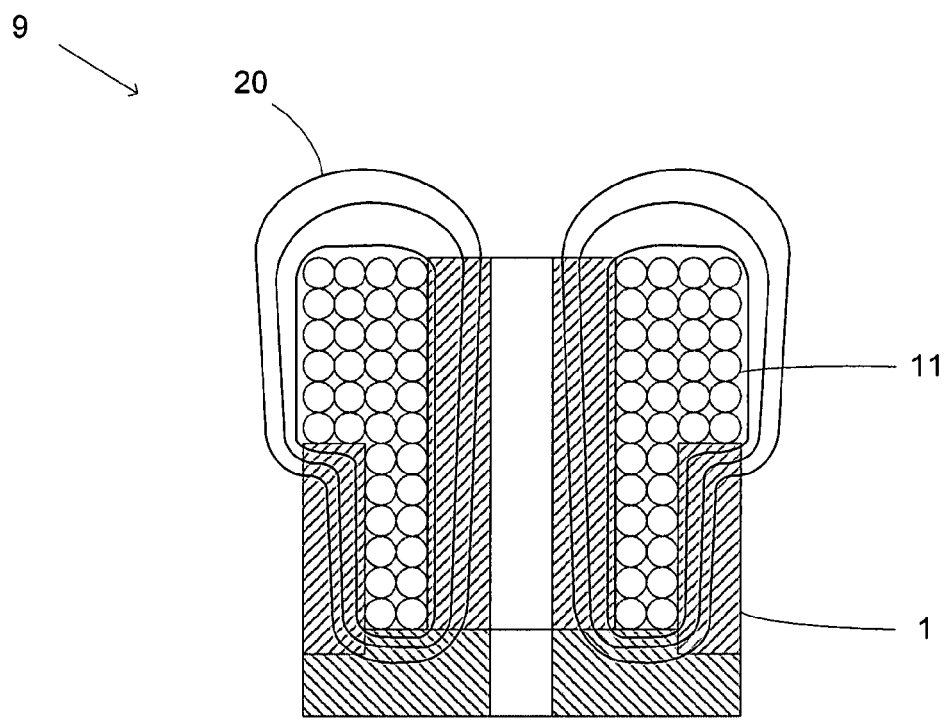
FIG. 8a shows a cross-section of a transmitter according to one embodiment of the present invention.
Figure 8B:
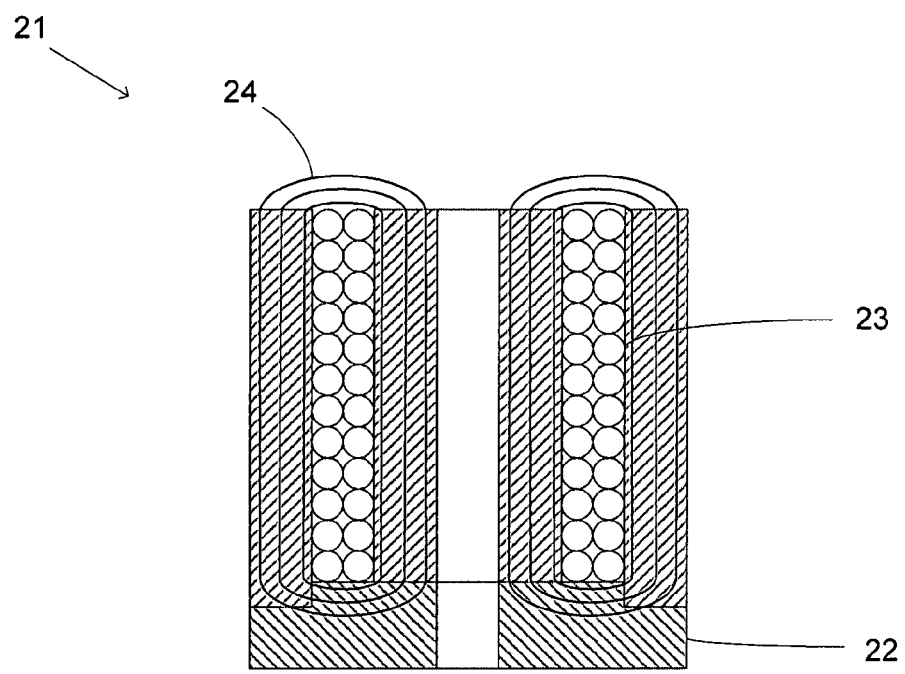
FIG. 8b shows a cross-section of a transmitter having a 'pot core' type core.

When an alternating current is supplied to the windings, a magnetic field is generated. It will be appreciated that the magnetically permeable core not only increases the inductance of the transmitter (or receiver) but also 'guides' the field. FIG. 8a shows a cross-section through a transmitter 9 having a core 1 and windings 11, and the field 20 generated by a transmitter when there is no receiver present. For comparison, FIG. 8b shows a cross-section through a transmitter 21 having a core 22 and windings 23 that occupy the same volume, but where the column and cylinder extend the same distance. This type of core 22 is sometimes called a 'pot core'.

As will be seen when comparing the fields 20, 24 in FIGS. 8a and 8b, the field 20 of the core 1 of the present invention is further from the core. Conversely, the field 24 of the pot core 22 remains relatively close to the core. (It will be appreciated that, in fact, a field extends to infinity, therefore the field lines in FIGS. 8a and 8b represent the part of the field that may be used for power transfer and represent the comparative shape of the field, for illustrative purposes.) The reasons for this difference include:

Having a shorter cylinder provides a volume that can be occupied by additional windings (volume C), and more windings increases the size of the field; and Having a shorter cylinder means that the field lines tend to pass around the windings in volume C, which results in the field lines going further from the core.

Though this shows how the field generated by a transmitter 9 may be 'improved' by the core 1 of the present invention, the way in which the core maintains an effective flux linkage for a range of relative displacements between a transmitting core and a receiving core are best understood by looking at the fields established between a transmitter and receiver pair.

Figure 9A:
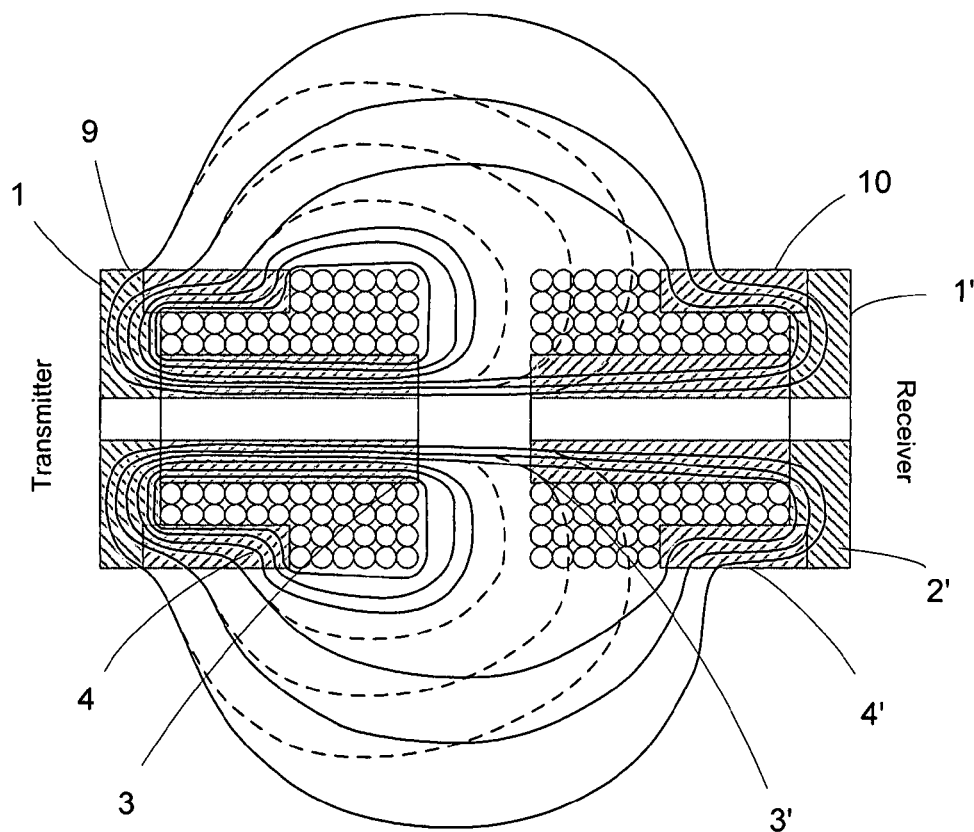
FIGS. 9a to 9c show cross-sections through transmitter and receiver pairs having different combinations of cores.
Figure 9B:
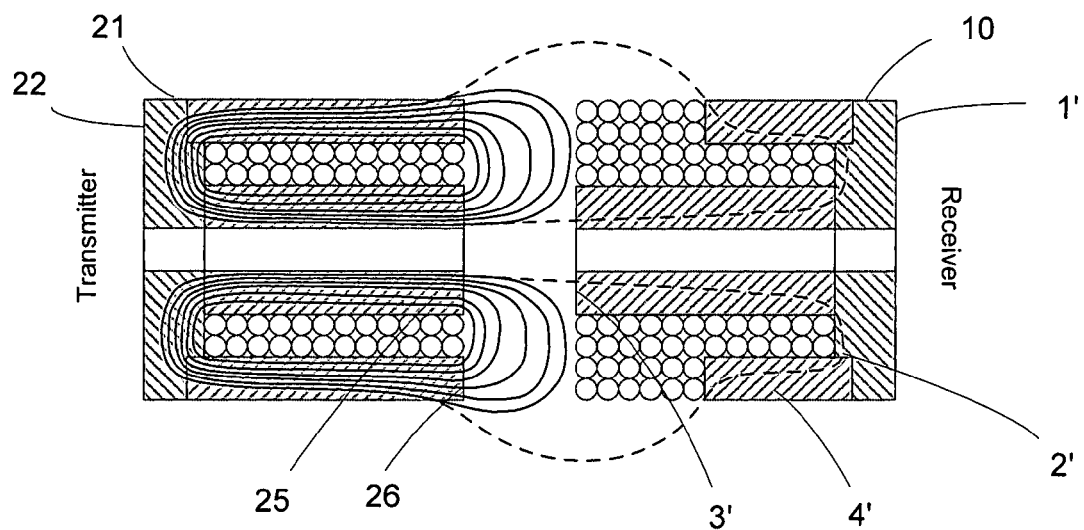
Figure 9C:
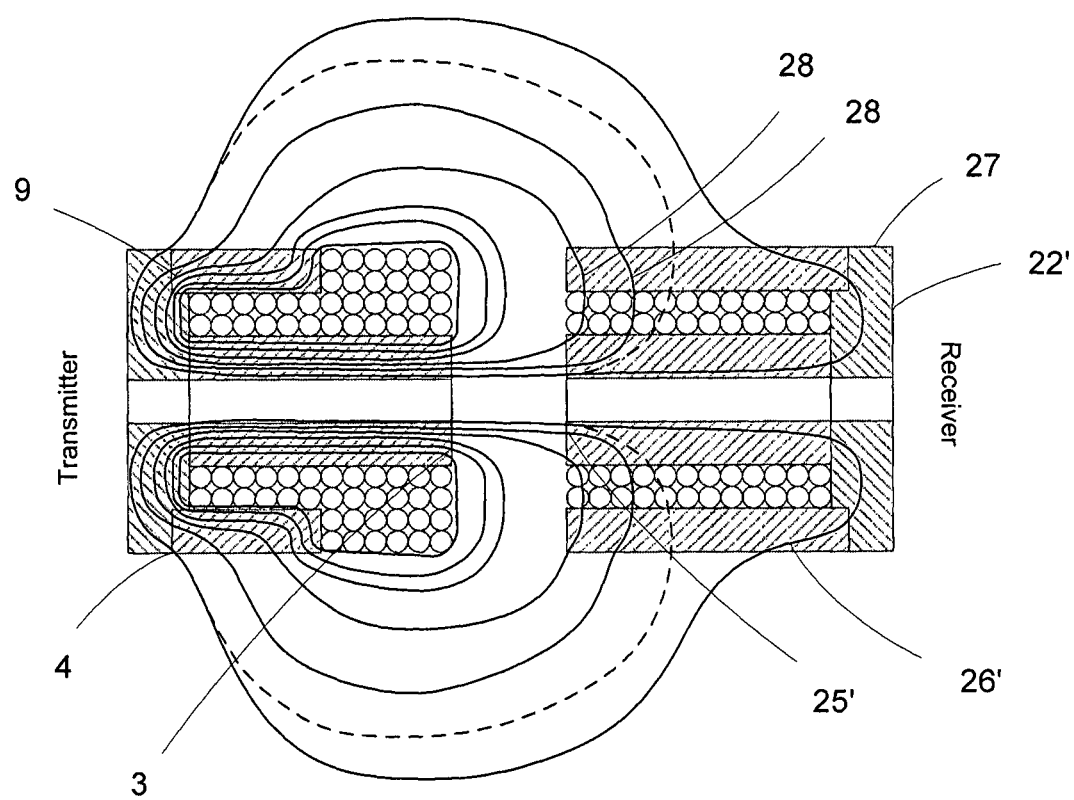

FIGS. 9a to 9c show cross-sections through transmitter and receiver pairs, and a comparison of fields generated for a range of core types. For the sake of comparison, each transmitter and receiver are aligned (i.e. their cylinders are collinear) with the same separation. It will be appreciated that, in fact, a field extends to infinity, therefore the field lines in FIGS. 9a to 9c represent the part of the field that may be used for power transfer and represent the comparative shape of the field for illustrative purposes.

FIG. 9a shows a transmitter 9 and receiver 10 which both include the core 1, 1' of the present invention (as shown also in FIG. 5). As can be seen, the field lines link from the transmitter column 3 to receiver column 3', through the receiver disk 2', then from the receiver cylinder 4' to the transmitter cylinder 4. This is because this path has lower reluctance (and is therefore preferred) to the path from the transmitter column 3 to transmitter cylinder 4 (as shown by the dotted lines). For comparison, FIG. 9b shows a transmitter 21 and receiver 10, where the transmitter includes a regular pot core 22, while the receiver includes the core 1' of the present invention. In this instance, despite their being the same separation between the transmitter and receiver as FIG. 9a, there is no flux linkage from the transmitter column 25 to the receiver column 3', receiver disk 2', receiver cylinder 4' and back to the transmitter cylinder 26. This is because is the path directly from the transmitter column 25 to transmitter cylinder 26 has a lower reluctance (and is therefore preferred) to the path via the receiver (as shown by the dotted line). Also, as with the explanation of FIGS. 8a and 8b, the core 1 of the present invention provides a volume that can be occupied by additional windings (volume C), and more windings increases the strength and size of the field. This demonstrates how the core of the present invention maintains a flux linkage for larger separations.

FIG. 9c shows a transmitter 9 and receiver 27 where the transmitter includes the core 1 of the present invention, while the receiver includes a regular pot core 22'. As with FIG. 9a, the field lines may link from the transmitter column 3 to receiver column 25', through the receiver core 22', then from the receiver cylinder 26' to the transmitter cylinder 4. However, due to the longer receiver cylinder (compared to the receiver cylinder 4' of FIGS. 9a and 9b), the field lines may go directly from the receiver column 25' to the receiver cylinder 26' without passing through the bulk of the receiver core 22'. This behaviour is demonstrated by two of the field lines 28. Therefore, having a pot core in the receiver may not be as effective as the core of the present invention.

FIGS. 10a to 10i and FIGS. 11a to 11i show a range of fields for two transmitter and receiver pairs, over an array of relative displacements. FIGS. 10a to 10i corresponds to the transmitter 9 and receiver 10 pair of FIG. 9a and FIGS. 11a to 11*i* corresponds to the transmitter 21 and receiver 10 pair of FIG. 9*b*. As will be seen by comparing the two sets of figures, the core of the present invention enables an effective flux linkage to be maintained for a larger range of relative displacements between a receiving core and a transmitting core.

Relative displacement may include lateral displacement (i.e. displacement in a plane parallel to the disk), lengthwise displacement (i.e. displacement perpendicular to a plane parallel to the disk) or a combination of both.

An effective flux linkage may be considered the flux linkage between a transmitter and receiver that is sufficient to transfer power. What is considered 'sufficient' will be dependent on the particular application, including:
the power requirements of the load; and
the tolerable amount of energy loss (i.e. required level of efficiency).

Figure 10A:
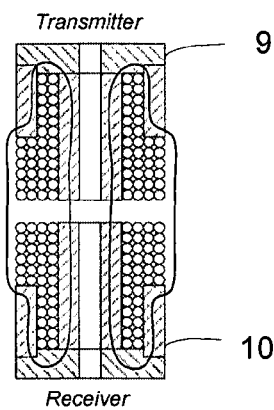
FIGS. 10a to 10i show cross-sections through the transmitter and receiver pair of FIG. 9a for an array of relative displacements.
Figure 10B:
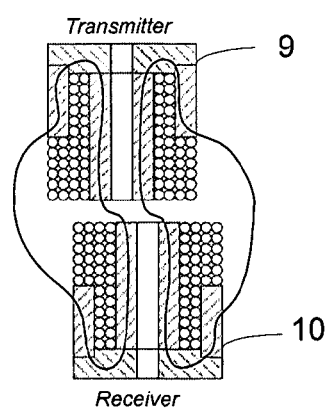
Figure 10C:
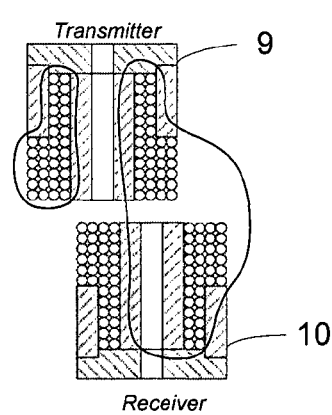
Figure 10D:
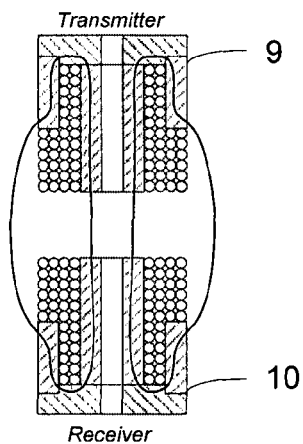
Figure 10E:
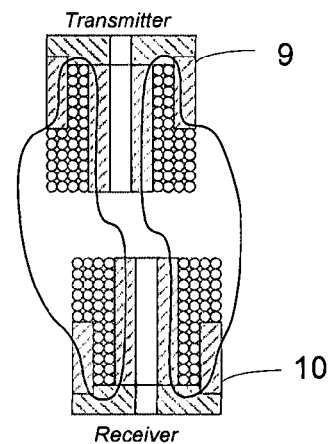
Figure 10F:
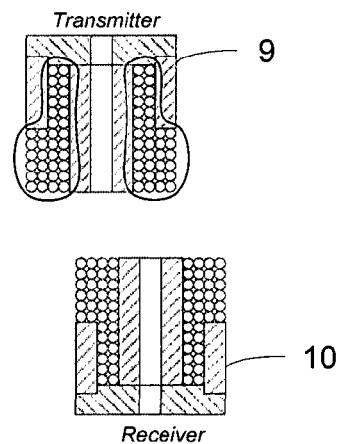
Figure 10G:
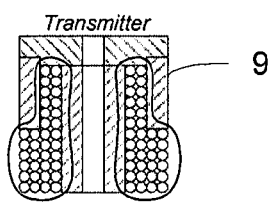
Figure 10H:
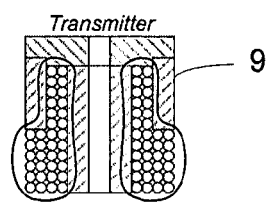
Figure 10I:
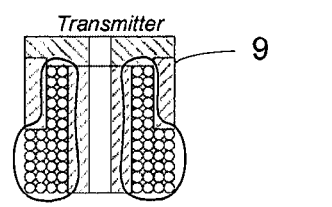
Figure 11A:
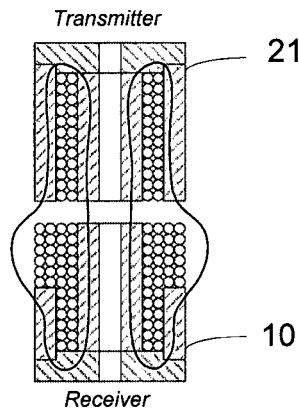
FIGS. 11a to 11i show cross-sections through the transmitter and receiver pair of FIG. 9b for an array of relative displacements.
Figure 11B:
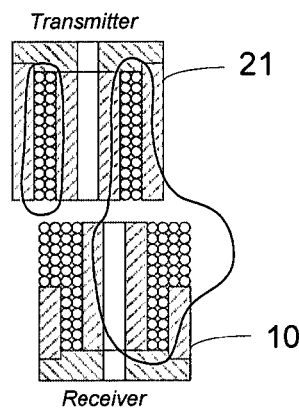
Figure 11C:
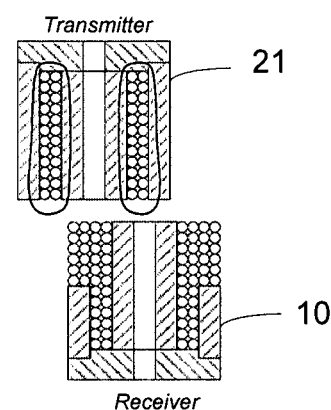
Figure 11D:
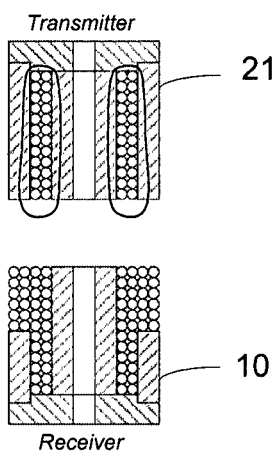
Figure 11E:
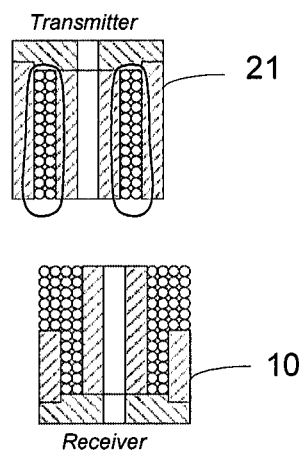
Figure 11F:
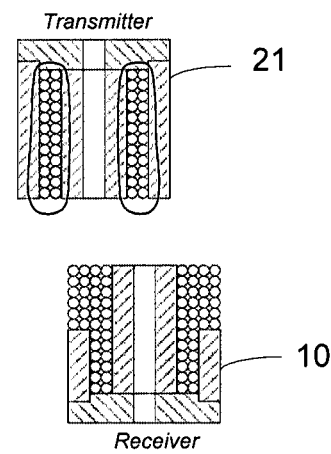
Figure 11G:
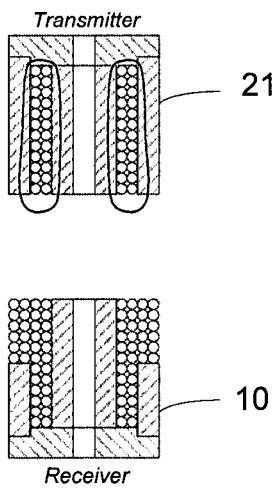
Figure 11H:
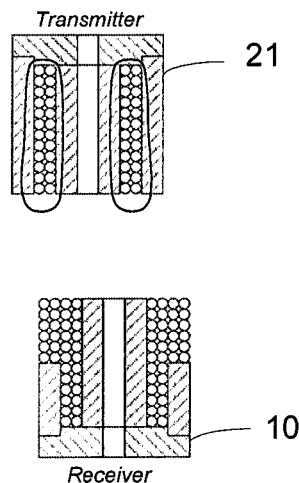
Figure 11I:
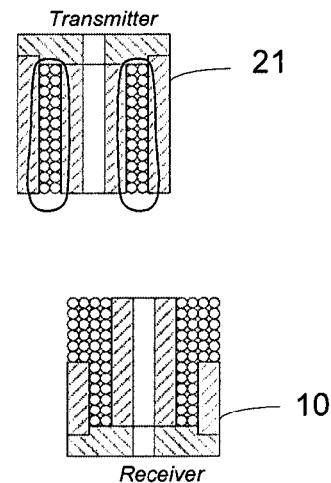

Therefore, if the field lines shown in the figures represent the upper limit of the part of the field that may be used for power transfer, then the field passing through the receiver indicates that there is an effective flux linkage. For example, FIGS. 10*a* and 11*a* show an effective flux linkage, whereas FIGS. 10*i* and 11*i* do not. Those skilled in the art will appreciate that the use of singular field lines on FIGS. 10*a*-10*i* and 11*a*-11*i* does not convey the complexity of the actual field, and the field lines used in the figures are drawn merely as illustrative.

The range of relative displacements is the range of relative displacement between the transmitting core and receiving core where there is still sufficient power transfer. The lower bound for the range of relative displacements will be zero—that is to say, the case where the transmitting core and receiving core are mutually aligned with no separation between them. However, the upper limit of the range of relative displacements is dependent upon the characteristics of the particular transmitter and receiver pair. In particular, the upper limit may be dependent on at least some of the following interrelated factors:
The volume of the core;
The inductance of the core;
The number of windings in the core;
The dimensions of the windings;
The current supplied to the transmitter windings;
The type of core used in the receiver;
The relative geometry of the parts of the core;
The relative angle between the windings of the transmitter and the windings of the receiver.

Someone skilled in the art will appreciate that a transmitter and receiver pair will be designed with these factors considered, and they may be weighted differently depending on the priorities of the particular case. For example, where a transmitter must fit inside a certain volume, this will determine the volume of the core. Then the thickness of the parts of the core (and therefore, the core's inductance) will need to be balanced against the number of windings able to fit inside the core to ensure there is sufficient power transfer up to a tolerable upper limit. In another example, the transmitter and receiver pair may be designed to ensure a large upper limit, which will require a larger core with a larger number of windings. These two examples demonstrate that the upper limit of the range of the relative displacements is dependent on these factors and the required operating characteristics of the transmitter and receiver pair.

Nevertheless, FIGS. 10*a* to 10*i* and FIGS. 11*a* to 11*i* demonstrate that for a core of fixed volume, the core of the present invention is an improvement, and provides a larger range of relative displacements.

For example, for a particular lengthwise displacement both a standard core and core of the present invention maintain an effective flux linkage. This is shown by FIG. 10*a* and FIG. 11*a*. For a longer lengthwise displacement a standard core may no longer maintain an effective flux linkage, whereas the core of the present invention will. This difference is shown by a comparison of FIG. 11*d* with FIG. 10*d*. Then, for a yet longer lengthwise displacement (the upper limit of the range of relative displacements) the core of the present invention may no longer maintain an effective flux linkage. This threshold exists somewhere between FIG. 10*d* and FIG. 10*g*.

Thus it has been shown that having the column extend further from the disk than the cylinder enables an effective flux linkage to be maintained for a range of relative displacements between a receiving core and a transmitting core, where that range will be larger than a similar core having a column not extend further.

A further benefit arises from the geometry of the core in that the core acts a shield, minimising the amount of flux that is 'behind' the core and windings (being the non-transmitting or non-receiving side). This is shown in FIG. 8*a* by the lack of field below the transmitter. Such shielding has two main benefits:
It minimises losses due to eddy currents arising in metallic components adjacent to the core and windings; and
It protects electronic components from interference due to leaked magnetic fields.

Figure 12:
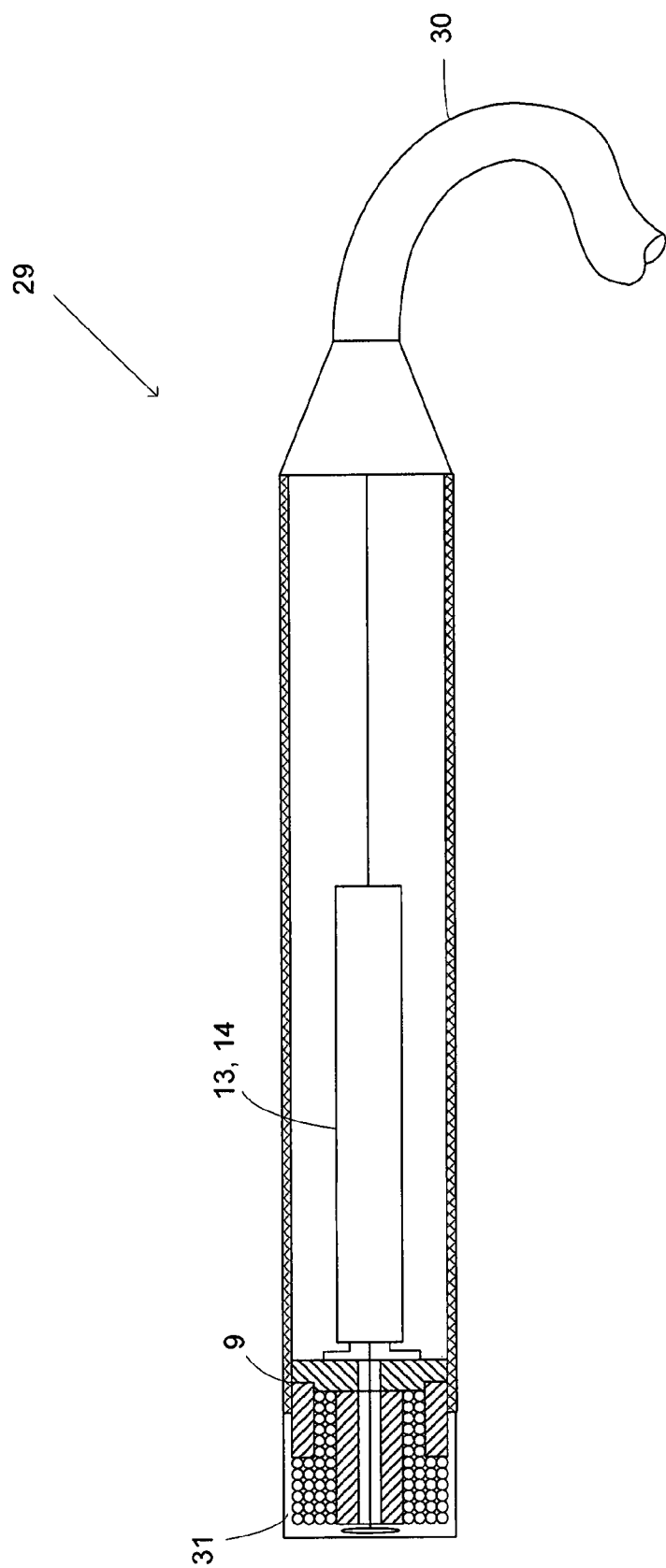
FIG. 12 shows a connector according to one embodiment of the present invention.

Such a transmitter or receiver may be incorporated into a connector 29 as shown in FIG. 12. Such a connector may include a suitable cable 30 that links the end of the connector to further electronic components (not shown). The connector may house all or part of the circuitry 13, 14 for controlling the transmitter 9 or receiver 10. The connector may include potting 31 to encase the core 1 and windings 11. Potting ensures the core and windings are protected and potting also serves to draw away heat.

As previously mentioned, the transmitter and receiver may be adapted to accommodate communication systems that may be used to communicate from transmitter to receiver and vice versa. Those skilled in the art will appreciate that there are any number of communication systems that are suitable for establishing such a data link, such as: optical systems, radio systems, near-field communication (NFC) systems, and systems that rely on modulating the signal applied to the windings. For those systems that rely on line of sight (optical) or an antenna, it may not be practical to have the communication system disposed behind the core and windings. In particular, the core may block a line of sight connection or it may shield a field produced by an antenna. Further, some systems may rely on a close proximity between antennas (for example, NFC). Therefore, the communication system, or part of the communication system, may reside on the transmitting or receiving side of the core, with a channel in the core providing access to the non-transmitting or non-receiving side of the core. The circuitry for controlling the communication systems may be incorporated into the circuitry for the transmitter and receiver.

Returning to FIG. 5, a channel 5 in the core 1, 1' through the disk 2, 2' and column 3, 3' provides access for an antenna 32, 32'. The antenna is located on the transmitting side and receiving side of the core, whilst the remainder of the communication system is at some position on the other side of the core. The transmitter antenna 32 is adapted to connect to the transmitter circuitry 13, whilst the receiver antenna 32' is adapted to connect to the receiver circuitry 14.

Figure 13C:
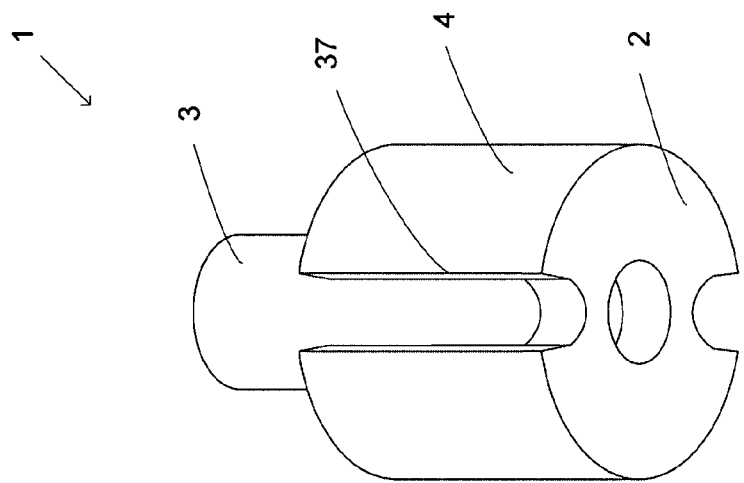
FIGS. 13a to 13c show magnetically permeable cores having different types of openings.
Figure 13B:
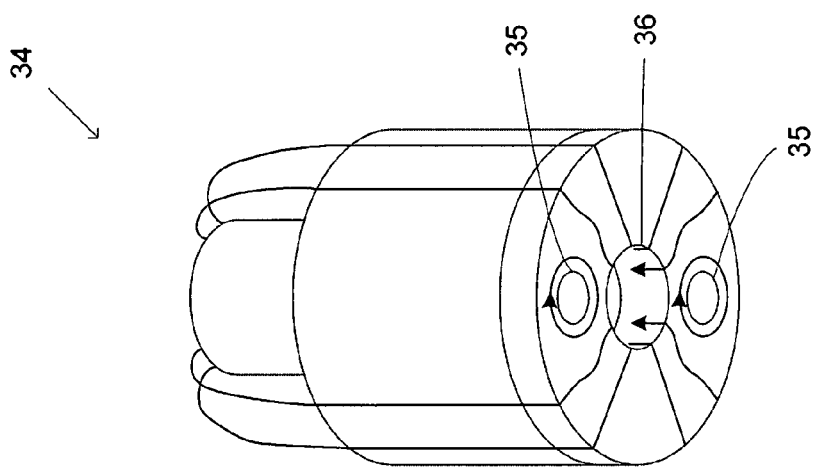
Figure 13A:
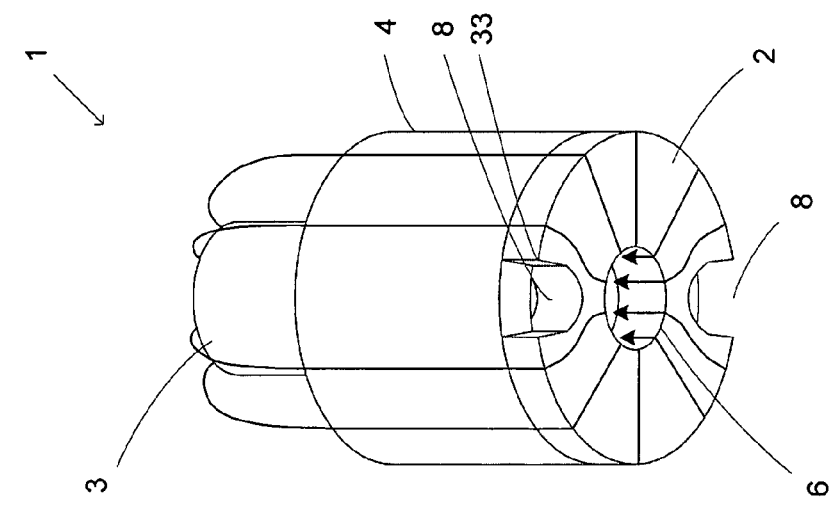

Another aspect of the core that has been previously mentioned is the openings provided in the disk to allow the windings to enter into the core. FIGS. 13a to 13c show the field in various core configurations. FIG. 13a shows the field in the core 1 of FIG. 1. The field goes along the cylinder 4, before spreading radially inwards in the disk, and then going along the column 3 and returning to the cylinder. At the cut-outs 8, the field passes around the cut-outs. By having the cut-out extend to the edge 33 of the disk, the field will not be inclined to encircle the opening. For comparison, FIG. 13b shows a similar core 34, but where the openings are holes 35. These holes produce an interfering flux path, whereby the magnetic field encircles the hole. This field causes heating in the core and results in energy loss. It will be noted that both cores in FIG. 13a and FIG. 13b include a central hole 6, 36. In this instance, the central hole does not cause interfering flux paths, since the hole is not in the path of the field. In other words, the core can be said to include openings, and if those openings are in the path of magnetic field, the openings should extend to an edge.

In the core 1 of FIG. 13a, the disk 2 and cylinder 4 are separate. If they were formed together, then the opening 8 would no longer be a cut-out but another hole (leading to the problems identified above). Therefore, the opening could be made to extend to the edge of the cylinder by including a slot 37 in the cylinder 4, as shown in FIG. 13c. In this way, the opening would not provide an interfering flux path. The cylinder would then be segmented into two half cylinders.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A magnetically permeable core for use in a wireless power transfer system, including a base having first and second portions extending away therefrom, wherein the first portion extends further from the base than the second portion to maintain an effective flux linkage throughout a range of relative displacements of a receiver from a transmitter;
   wherein the base includes at least one opening that allows access from one side of the base through to a space provided between the first portion and second portion, and the at least one opening extends to the edge of the base.

2. A magnetically permeable core as claimed in claim 1, wherein the first portion extends at least 20 percent further from the base than the second portion.

3. A magnetically permeable core as claimed in claim 1, wherein the second portion at least partially surrounds the first portion.

4. A magnetically permeable core as claimed in claim 1, wherein the base is a disk.

5. A magnetically permeable core as claimed in claim 4, wherein the first portion extends perpendicularly from the centre of the disk, and the second portion extends from the edge of the disk in the same direction as the first portion.

6. A magnetically permeable core as claimed in claim 1, wherein the first portion and base include a channel to permit a communications system to pass from one side of the core to another side of the core.

7. A magnetically permeable core as claimed in claim 6, including a communications system for communicating data.

8. A magnetically permeable core as claimed in claim 1, wherein a relative displacement in the range of relative displacements includes displacement in any direction.

9. A magnetically permeable core as claimed in claim 1, wherein a relative displacement in the range of relative displacements includes displacement in a direction that brings the receiving core and transmitting core out of alignment.

10. A magnetically permeable core as claimed in claim 1, wherein a relative displacement in the range of relative displacements includes displacement in a direction that separates the receiving core and transmitting core while maintaining alignment.

11. A magnetically permeable core as claimed in claim 1, wherein the magnetically permeable core is made from ferrite.

12. A magnetically permeable core as claimed in claim 1, wherein the first portion extends at least 20 percent further from the base than the second portion.

13. A magnetically permeable core as claimed in claim 1, wherein the second portion at least partially surrounds the first portion.

14. A magnetically permeable core as claimed in claim 1, wherein the windings comprise loops of wire.

15. A magnetically permeable core as claimed in claim 14, wherein the loops of wire are configured to have as large a diameter as the dimensions of the magnetically permeable core permit.

16. A transmitter or receiver for use in a wireless power transfer system, including windings and a magnetically permeable core having a base having first and second portions extending away therefrom, wherein the first portion extends further from the base than the second portion to maintain an effective flux linkage throughout a range of relative displacements of a receiving core from a transmitting core and wherein the windings surround the first portion at least partially in a space between the first portion and second portion;
   wherein the windings occupy, at least in part, the space surrounding the first portion that extends further than the second portion, and the windings occupy, at least in part, the space that would be occupied by the second portion were the second portion to extend the same distance from the base as the first portion.

17. A transmitter or receiver as claimed in claim 16, wherein the windings are wound onto a bobbin that is fitted onto the core.

18. A transmitter or receiver as claimed in claim 16, wherein the transmitter or receiver is incorporated into a connector.

19. A transmitter and receiver for use in a wireless power transfer system, wherein both the transmitter and receiver include windings and a magnetically permeable core, and the magnetically permeable core of the transmitter has a base having first and second portions extending away therefrom, wherein the first portion extends further from the base than the second portion such that the first portion of the magnetically permeable core of the transmitter is in closer proximity to the magnetically permeable core of the receiver than the second portion of the transmitter;

wherein the transmitter windings occupy, at least in part, the space provided between the first portion and second portion, the transmitter windings occupy, at least in part, the space surrounding the first portion that extends further than the second portion, and the transmitter windings occupy, at least in part, the space that would be occupied by the second portion were the second portion to extend the same distance from the base as the first portion.

20. A transmitter and receiver as claimed in claim 19, wherein the transmitter includes transmitter circuitry that is at least partly incorporated into the transmitter connector, and the receiver includes receiver circuitry that is at least partly incorporated into the receiver connector.

\* \* \* \* \*